(12) United States Patent
Wang et al.

(10) Patent No.: US 8,724,053 B2
(45) Date of Patent: May 13, 2014

(54) LIQUID CRYSTAL DISPLAY HAVING PARTICULAR OPTICAL FILM ON THE DISPLAY PANEL

(75) Inventors: Tsang-Chi Wang, Tainan (TW); Wang-Yang Li, Tainan (TW)

(73) Assignee: Chi Mei Corporation, Tainan (TW)

( * ) Notice: Subject to any disclaimer, the term of this patent is extended or adjusted under 35 U.S.C. 154(b) by 146 days.

(21) Appl. No.: 13/542,600

(22) Filed: Jul. 5, 2012

(65) Prior Publication Data

US 2013/0010227 A1  Jan. 10, 2013

Related U.S. Application Data

(60) Provisional application No. 61/504,347, filed on Jul. 5, 2011.

(51) Int. Cl.
*G02F 1/1335* (2006.01)
*G09F 13/04* (2006.01)

(52) U.S. Cl.
USPC ................. 349/61; 349/62; 362/97.2

(58) Field of Classification Search
CPC .......... G02F 1/133615; G02F 1/133603; G02F 1/133604; G02F 1/133605; G02F 1/133608; G02F 2001/133607; G02F 6/0053
USPC ....................... 349/61, 62; 362/97.2
See application file for complete search history.

(56) References Cited

U.S. PATENT DOCUMENTS

| | | | |
|---|---|---|---|
| 7,688,511 B2 * | 3/2010 | Komatsu et al. | 359/566 |
| 8,325,297 B2 * | 12/2012 | Uehara et al. | 349/95 |
| 2012/0177890 A1 * | 7/2012 | Sung et al. | 428/172 |

* cited by examiner

*Primary Examiner* — Mike Qi
(74) *Attorney, Agent, or Firm* — McClure, Qualey & Rodack, LLP

(57) ABSTRACT

A liquid crystal display including a display panel, an optical film and a backlight module is disclosed. The optical film is disposed on the display panel and has a plurality of micro structures facing the display panel arranged on the optical film. The period of the arranged micro structures is between 90 μm~3 μm. The backlight module and the optical film are disposed on opposite sides of the display panel respectively. The backlight module is used for emitting a light, which penetrates the display panel and reaches the optical film. The light is deflected by the micro structures of the optical film and then is emitted to the outside at an angle of 20~70 degrees relative to a normal line of the light outputting plane of the optical film.

18 Claims, 6 Drawing Sheets

US 8,724,053 B2

LIQUID CRYSTAL DISPLAY HAVING PARTICULAR OPTICAL FILM ON THE DISPLAY PANEL

This application claims the benefit of U.S. provisional application Ser. No. 61/504,347, filed Jul. 5, 2011, the subject matter of which is incorporated herein by reference.

BACKGROUND OF THE INVENTION

1. Field of the Invention

The invention relates in general to a liquid crystal display, and more particularly to a liquid crystal display with wide viewing angle.

2. Description of the Related Art

The most commonly seen large size commercial liquid crystal displays are such as twisted nematic (TN) display, In-plane switching (IPS) display, and multi-domain vertical alignment (MVA) display. The biggest problem with the TN display is the viewing angle being too narrow, and particularly grey level inversion will occur when the downward angle of visibility is about 30 degrees. In comparison with the TN display, the IPS display or the MVA display provides wider viewing angle but incurs higher manufacturing cost than the TN display. Since the transmittance of the IPS display or the MVA display is only about 60~80% of that of the TN display, the brightness of the backlight module needs to be increased. Consequently, the manufacturing cost and power consumption of the backlight module increase and the problem of poor heat dissipation arises.

Although the use of wide viewing compensation film may resolve the viewing angle problem for the TN display by increasing the left/right viewing angles to 140 degrees and the top/down viewing angles to 120 degrees, the problem of grey level inversion still left unresolved. In the application of large outdoor advertising billboards whose viewers are standing under the billboards, the display needs the function of displaying the advertisement downwards more than the function of displaying the advertisement in a wide viewing angle. Particularly, the large size outdoor advertising billboards need even higher brightness, so the heat dissipation for the lamp tubes of the backlight module becomes more important.

SUMMARY OF THE INVENTION

The invention is directed to a liquid crystal display having an image light deflection device capable of deflecting the incident light to a specific orientation. For example, the liquid crystal display has an optical film with a plurality of micro structures for deflecting an image at a specific viewing angle. When combined with the function of displaying an image at different viewing angles, the liquid crystal display further provides wide viewing angle display function to resolve the disadvantages of the generally known technologies disclosed above.

According to an embodiment of the present invention, a liquid crystal display is disclosed. The liquid crystal display includes a display panel, an optical film and a backlight module. The optical film is disposed on the display panel and has a plurality of micro structures facing the display panel arranged on the optical film. The period of the arranged micro structures is between 90 µm~3 µm. The backlight module and the optical film are disposed on opposite sides of the display panel respectively. The backlight module is used for emitting a light, which penetrates the display panel and reaches the optical film. The light is deflected by the micro structures of the optical film and then is emitted to the outside at an angle of 20~70 degrees relative to a normal line of the light outputting plane of the optical film.

According to another embodiment of the present invention, a liquid crystal display is disclosed. The liquid crystal display includes a display panel, an optical film and a backlight module. The optical film is disposed on the display panel, and has a plurality of micro structures. The period of the arranged micro structures is between 90 µm~3 µm. The backlight module and the optical film are disposed on opposite sides of the display panel respectively. The backlight module is used for emitting a light.

The above and other aspects of the invention will become better understood with regard to the following detailed description of the preferred but non-limiting embodiments. The following description is made with reference to the accompanying drawings.

DETAILED DESCRIPTION OF THE INVENTION

According to the liquid crystal display disclosed in the present embodiment, the optical film disposed on the display panel is used for deflecting the normal image viewable at outgoing angles of 0~20 degrees (the front viewing angle is defined as 0 degrees) to be viewable at other viewing angles larger than 20 degrees. Therefore, the normal image originally viewable only at outgoing angles of 0~20 degrees are now viewable at viewing angles larger than 20 degrees. In addition, the optical film of the present embodiment may adopt different designs for deflecting various portions of the lights to wider viewing angles. Examples of different designs are as follows: Firstly, the optical film can be distributed all over the micro structures for deflecting most of the incident light to wide viewing angles. Secondly, in order to maintain the light intensity of image at the front viewing angle, the ratio of the distribution area of the micro structures to the area of the optical film can be reduced to adjust the ratio of the light emitted from the front viewing angle. Thirdly, the shape of the apex or the base plane of the micro structures may be adjusted to increase the ratio of the light emitted from the front viewing angle.

A number of embodiments are disclosed below for elaborating the invention. However, the embodiments of the invention are for detailed descriptions only, not for limiting the scope of protection of the invention.

First Embodiment

Figure 1:
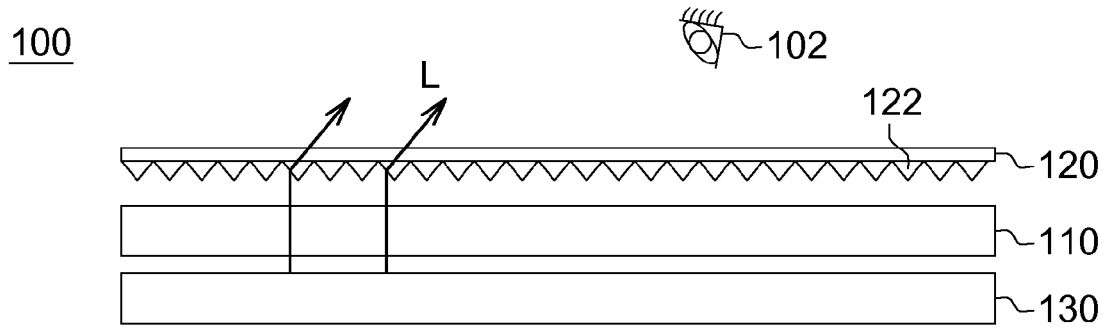
FIG. 1 shows a schematic diagram of a liquid crystal display and its optical film according to an embodiment of the invention.

Referring to FIG. 1, a schematic diagram of a liquid crystal display and its optical film according to an embodiment of the invention is shown. The liquid crystal display 100 includes a display panel 110, a backlight module 130 and an optical film 120. The backlight module 130 and the optical film 120 are disposed on opposite sides of the display panel 110 respectively. Let the transmissive liquid display panel be taken for example. The backlight module 130 is disposed on the light incident side of the display panel 110, and the optical film 120 is disposed on the light emitting side of the display panel 110. The light emitted by the backlight module 130 (such as the light L entering at the front viewing angle) penetrates the display panel 110 and reaches the optical film 120, and then is deflected to other viewing angle by the optical film 120. That is, the light L, having been deflected by the optical film 120, is deflected to a specific orientation (such as downward viewing angle), such that the human eyes 102 may now view the image information, which were originally viewable only at viewing angle of 0~20 degrees, at larger viewing angles, and the narrow viewing angle problem encountered by the generally known technologies can thus be resolved.

Since the viewing angle of conventional TN display is narrow, most of the display used in outdoor advertising billboards adopts the IPS display or the MVA display of wide viewing angle technology. The optical film 120 of the present embodiment may be used in the TN display for resolving the problem of narrow viewing angle, particularly the grey level inversion which occurs when the viewing angle is larger than 30 degrees. Therefore, the viewers standing under the display still can see the advertisements displayed downwards. The advantages of the TN display are exemplified below. The TN display incurs lower manufacturing cost and has higher transmittance than the IPS display or the MVA display. There is no need to spend extra cost and power consumption for increasing the brightness of the backlight module 130, and the problem of poor heat dissipation encountered by the backlight module 130 can thus be resolved. Apart from being used in the TN display, the optical film 120 of the present embodiment may also be used in the IPS display or the MVA display.

Figure 2:
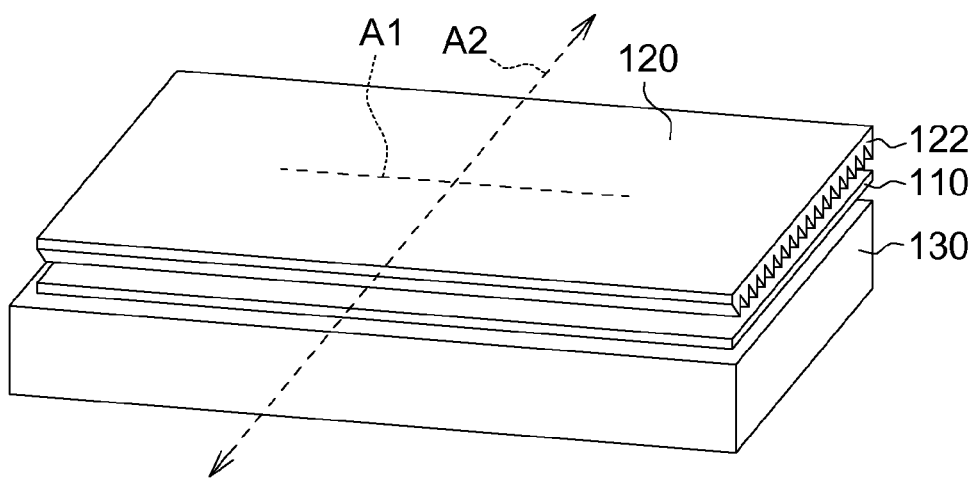
FIG. 2 shows a 3D schematic diagram of an optical film being disposed on a display panel.

FIG. 2 shows a 3D schematic diagram of an optical film being disposed on a display panel 110. As indicated in FIG. 2, the micro structures 122 of the optical film 120 are in the shape of triangular prisms arranged in strips, the column axis direction A1 is substantially perpendicular to the up/down visual axis A2 of the display panel 110 for deflecting the incident light to the downward view orientation or the upward view orientation. However, the optical film 120 of the present embodiment is not limited to deflecting the incident light to the downward view orientation or the upward view orientation, and may also deflect the incident light to the left view orientation, the right view orientation or other orientations, and the invention is not limited thereto. It should be explained that the arrangement direction of each micro structure 122 on the optical film 120 is directly associated with the direction of deflection of the light L. For deflecting the light L to the upward/downward view orientation, the arrangement direction of each micro structure 122 on the optical film 120 is perpendicular to the top/bottom visual axis A2 of the display panel 110 (as indicated in FIG. 2). For deflecting the light L to the left/right view orientation, the arrangement direction of each micro structure 122 on the optical film 120 is perpendicular to the left/right visual axis of the display panel 110. As indicated in FIG. 2, the micro structures 122 may also be directly formed on a transparent substrate and does not have to be combined with the optical film 120. Therefore, the optical film 120 may be replaced with a transparent substrate.

Figure 3:
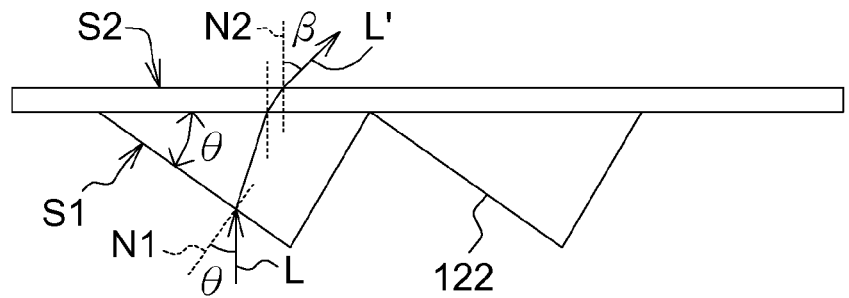
FIG. 3 shows an enlarged schematic view of the micro structures of the optical film of FIG. 2.

FIG. 3 shows an enlarged schematic view of the micro structures 122 of the optical film of FIG. 2. As indicated in FIG. 3, the micro structures 122 are disposed under the substrate (or the optical film 120), and face the display panel 110. The cross-sectional shape of the micro structures 122 is a non-isosceles triangle whose apex angle is equal to 60 degrees. Let the angle contained between the side of the micro structures 122 and the light outputting plane S2 be θ. When the light L enters the light-incoming plane S1 of the micro structures 122, the angle contained between the normal line N1 of the light-incident plane S1 and the incident light is defined as the incident angle (also equal to θ). Then, the light L is emitted to the outside through the light outputting plane S2 of the optical film 120. The angle contained between the normal line N2 of the light outputting plane S2 and the outgoing light L' (adding in FIG. 3) is defined as the deflection angle β. The relationship between the incident angle θ and the deflection angle β is expressed in formula (1) as:

$$\beta = \sin^{-1}\left(n\sin\left(\theta - \sin^{-1}\frac{\sin\theta}{n}\right)\right) \quad (1)$$

Wherein, n denotes the refractive index of the micro structures 122.

Figure 4:
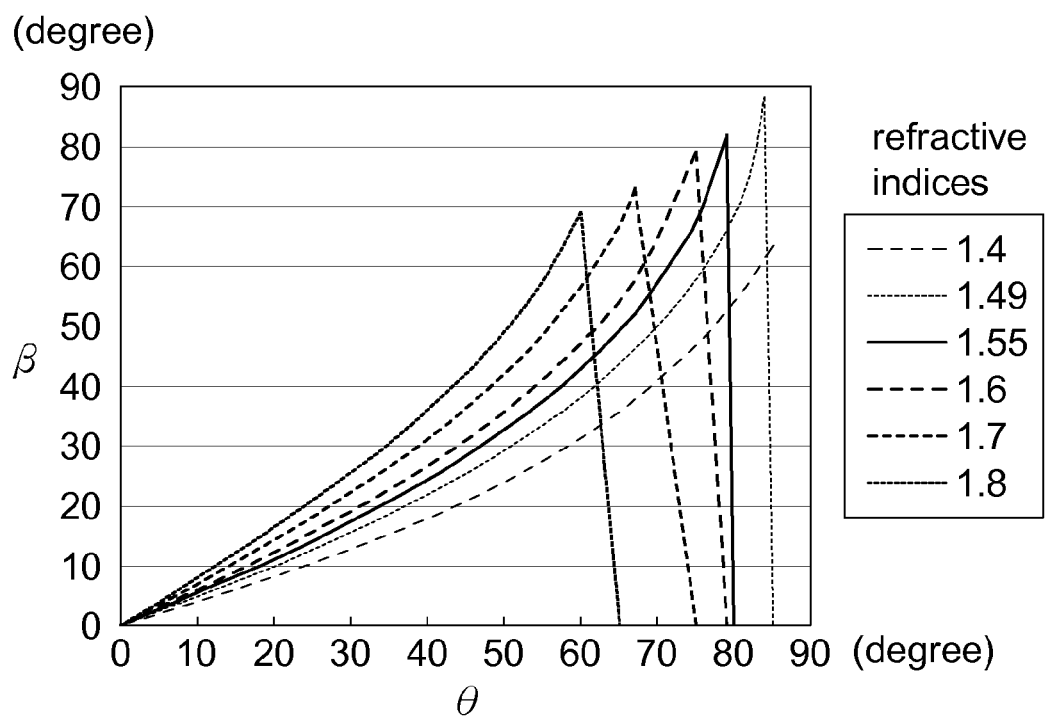
FIG. 4 shows a simulation diagram of deflection angle vs. incident angle for micro structures with different refractive indices.

With respect to the refractive index n of different materials, the relationship of the deflection angle β vs. the incident angle θ for the micro structures 122 with different refractive indices is obtained by way of simulation, and the results indicated in FIG. 4 show that the refractive index n is between 1.4~1.8. FIG. 4 shows that when the incident angle θ is about 60 degrees, the light passing through the micro structures 122 whose refractive index is 1.4 is deflected to a deflection angle β about 30 degrees relative to the light outputting plane, and the critical angle of the incident light is 88 degrees more or less. When the incident angle θ is about 35 degrees, the light passing through the micro structures 122 whose refractive index is 1.8 is deflected to a deflection angle β about 30 degrees relative to the light outputting plane, and the critical angle of the incident light is 70 degrees more or less. Regardless the refractive index being high or low, when the incident angle is over 30 degrees, the range of the incident angle is farther away from the critical angle of the incident light. Therefore, other incident lights of wider incident angles still can be emitted to the outside from the micro structures 122, and the light L will not be totally reflected in the micro structures 122 and cannot be emitted to the outside. In the present embodiment, when the range of the deflection angle β is between 20~70 degrees, the refractive index of the micro structures is between 1.4~1.8, and the range of the apex angle of the micro structures 122 is between 135~40 degrees, the disadvantage of the narrow viewing angle is improved.

Figure 5:
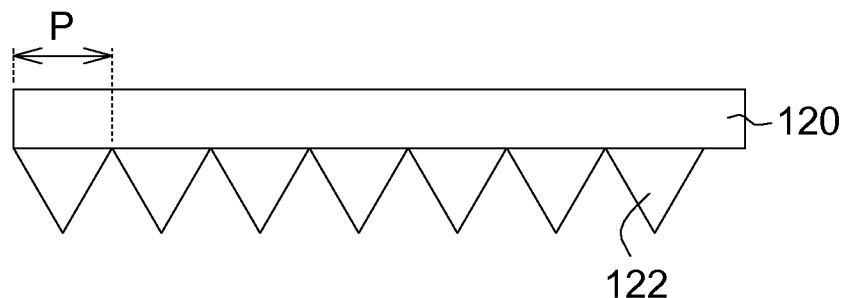
FIG. 5 shows an enlarged schematic view of the micro structures of the optical film of FIG. 2.
Figure 6:
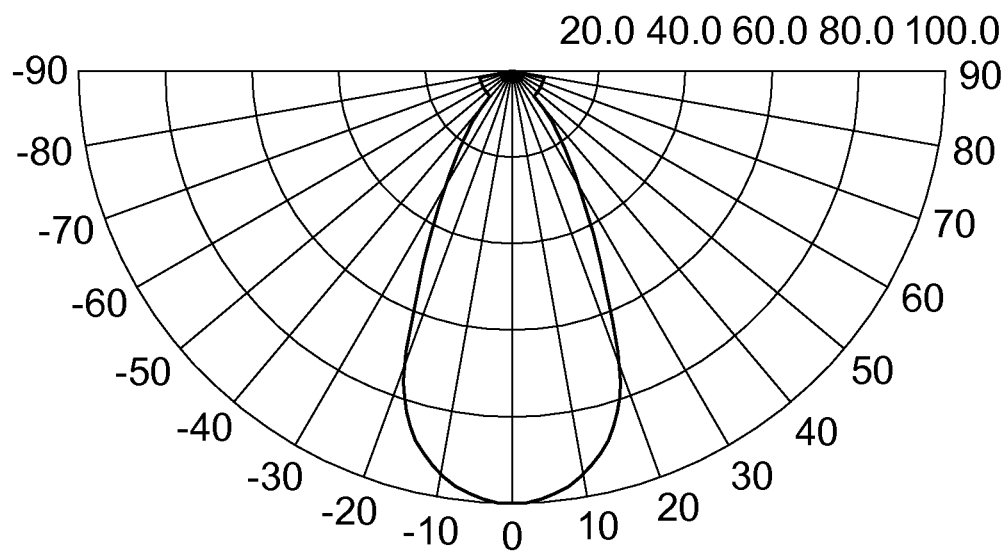
FIG. 6 shows a light profile before a light enters an optical film at an angle of 0~30 degrees.

Referring to FIG. 5, an enlarged schematic view of the micro structures 122 of the optical film 120 of FIG. 2 is shown. As indicated in FIG. 5, the micro structures 122 are disposed under the optical film 120, and face the display panel 110. The cross-sectional shape of the micro structures 122 is an equilateral triangle whose apex angle and base angle are both equal to 60 degrees, for example. To avoid the human eyes noticing the micro structures 122 and feeling the image being distorted, the size of the micro structures 122 is normally smaller than 100 μm. However, if the size of the micro structures 122 is as small as the wavelength of the incident light, the light might be diffracted and the color dispersion caused by the reflection of the ambient light might be easily seen. Therefore, in the present embodiment, the arrangement period of the micro structures 122 is designed to be between 90 μm~3 μm. As indicated in FIG. 5, let the period P be equal to 10 μm. A comparison of the light profile (referring to FIG. 6) before the incident light enters the optical film 120 and the light profile (referring to FIG. 7) after the incident light enters the optical film 120 is obtained by using optical simulation software. The simulation results show the deflection when an incident light of 0~30 degrees passes through the optical film 120. The light originally emitted at an angle of 0 degrees (the front viewing angle) is basically deflected to an orientation whose up/down viewing angle is 38 degrees more or less, largely improving the problem of grey level inversion with large viewing angles.

Figure 8:
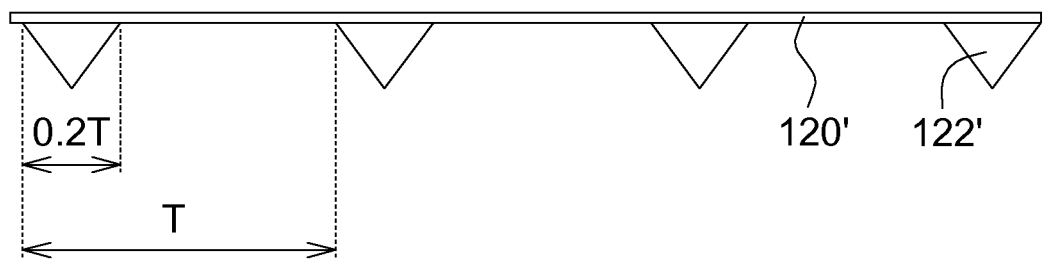
FIG. 8 shows a schematic diagram of an optical film according to another embodiment of the invention.

Referring to FIG. 8, a schematic diagram of an optical film according to another embodiment of the invention is shown. As indicated in FIG. 8, the optical film 120' may adjust the ratio of the light emitted to the outside at the front viewing angle by reducing the ratio of the distribution area of the micro structures 122' to the area of the optical film 120'. For example, the triangular micro structures 122' whose base angle is equal to 60 degrees are distributed over and occupy 20% of the area of the optical film 120'. The area of the micro structures 122 disposed in a single period T is only 0.2 times of the area in the single period T, such that the brightness of the front viewing angle image is more than 80% of the brightness when the optical film 120 is not disposed. The light intensity of image at the front viewing angle can thus be maintained. In the above embodiments, the ratio of the distribution area of the micro structures 122' may be adjusted according to actual situations and is such as between 20%~100%.

Figure 9:
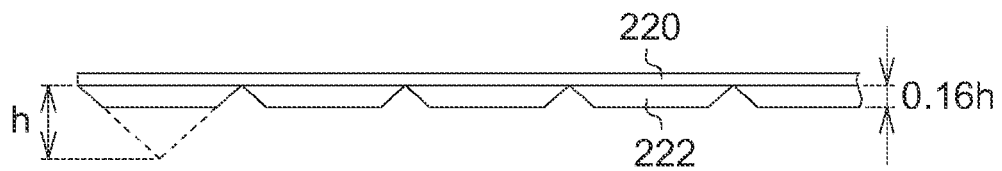
FIG. 9 shows a schematic diagram of an optical film according to another embodiment of the invention.

Referring, FIG. 9, a schematic diagram of an optical film according to another embodiment of the invention is shown. As indicated in FIG. 9, the micro structures 222 are columnar bodies arranged in strips, and the optical film 220 adjusts the ratio of the light emitted to the outside at the front viewing angle by changing the shape of the micro structures 222 to a trapezoid. For example, the height of the trapezoidal micro structures 222 is 0.16~0.2 times of the height h of the original triangular structure whose base plane and base angle are identical to that of the trapezoidal micro structures 222. The brightness of image at the front viewing angle may remain more than 80% of the brightness when the optical film 220 is not disposed so as to maintain the light intensity of image at the front viewing angle. Let the trapezoidal micro structures 222 whose height is equal to 0.1~0.08 times of the height h of the original triangular structures be taken for example. The brightness of image at the front viewing angle may remain more than 90% of the brightness when the optical film 220 is not disposed. Therefore, when the brightness of image at the front viewing angle needs to be 50%~90% of the brightness when the optical film 220 not is disposed, the height of the trapezoidal structures needs to be 0.5~0.08 times of the original height h.

Figure 10A:
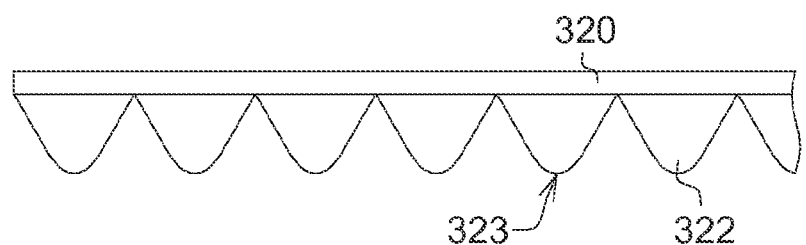
FIGS. 10A and 10B respectively show a schematic diagram of an optical film according to another embodiment of the invention.
Figure 10B:
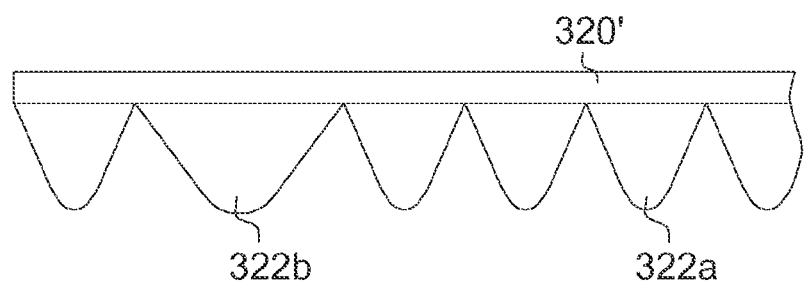

Referring to FIGS. 10A and 10B, schematic diagrams of an optical film according to another embodiment of the invention are respectively shown. As indicated in FIG. 10A, the optical film 320 adjusts the ratio of the light emitted to the outside at the front viewing angle by changing the shape of the apex of the micro structures 322 to an arc 323. As indicated in FIG. 10B, apart from changing the shape of the apex of the micro structures 322a and 322b to the arc 323, the optical film 320' further changing the base angle of the micro structures 322b, such that the base angle of a part of the micro structures 322b is smaller than the base angle of other micro structures 322a adjacent thereto. The base angle of the micro structures 322a differs with the base angle of the micro structures 322b by about 5~60 degrees. Thus, the ratio of the distribution area of the micro structures 322b to the area of the optical film 320 is increased so as to change the light intensity of image at the front viewing angle.

Figure 7:
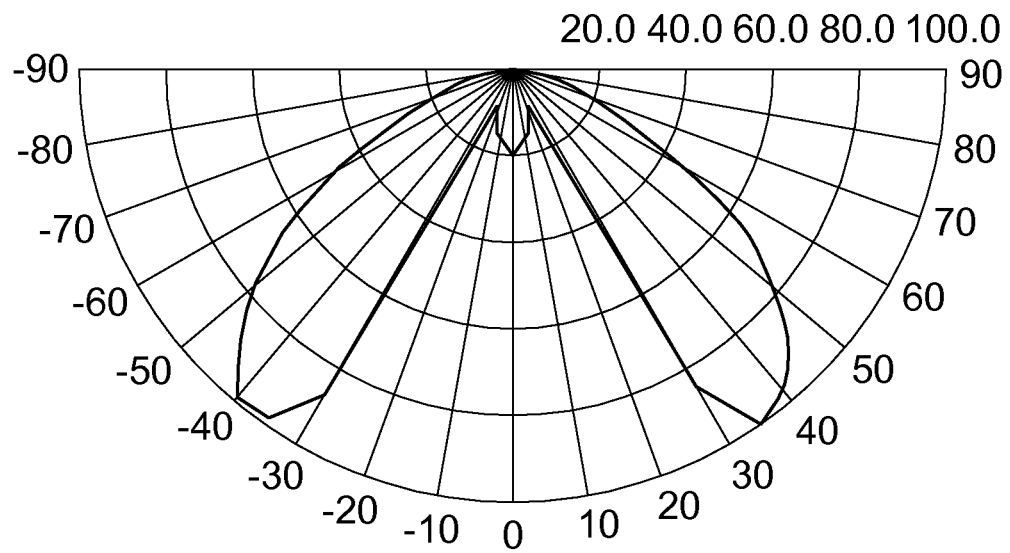
FIG. 7 shows a light profile after a light enters an optical film at an angle of 0~30 degrees.
Figure 11A:
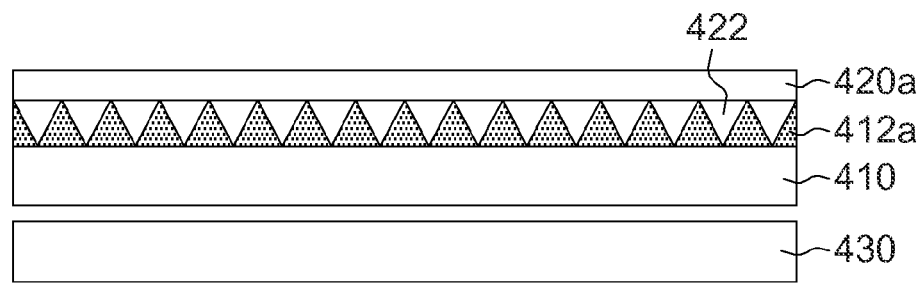
FIGS. 11A and 11B respectively show a schematic diagram of an optical film disposed on the display panel by using glue.
Figure 12:
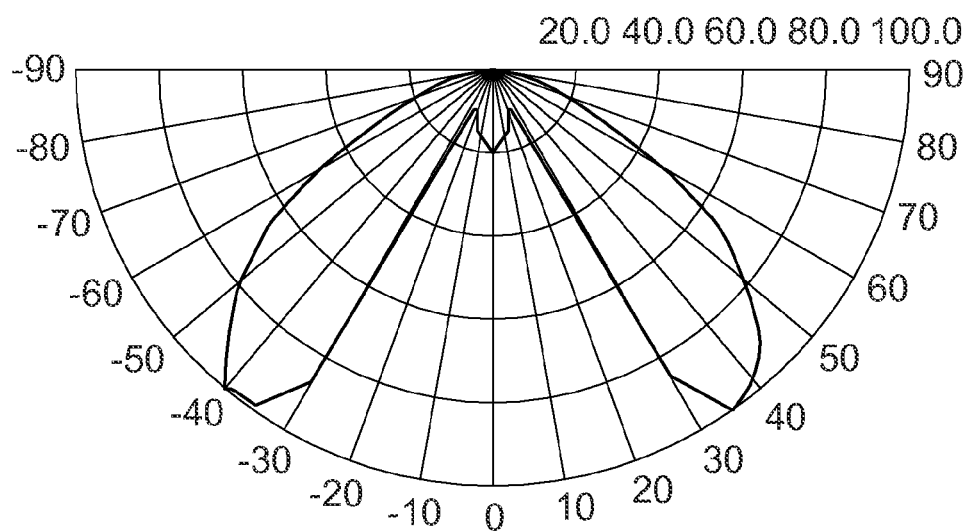
FIG. 12 shows a light profile after a light enters an optical film at an angle of 0~30 degrees.

Referring to FIG. 11A, a schematic diagram of an optical film 420a being disposed on a display panel 410 by using a glue 412a is shown. In the present embodiment, when the glue 412a is formed on the optical film 420a, the glue 412a also fills up the gaps between the micro structures 422, and the traveling direction of the light will be changed accordingly. Therefore, the angles of the micro structures 422 are re-adjusted, and suitable refractive indices of the micro structures and the glue 412a are selected. For example, the shape of the micro structures 422 is changed to isosceles triangles whose apex angle is 40 degrees, the refractive index of the micro structures 422 is 1.8 and the refractive index of the glue is 1.49. The simulation results are shown FIG. 12. FIG. 12 shows that after adjustment, the light profile is close to the light profile of the original design (FIG. 7).

Figure 11B:
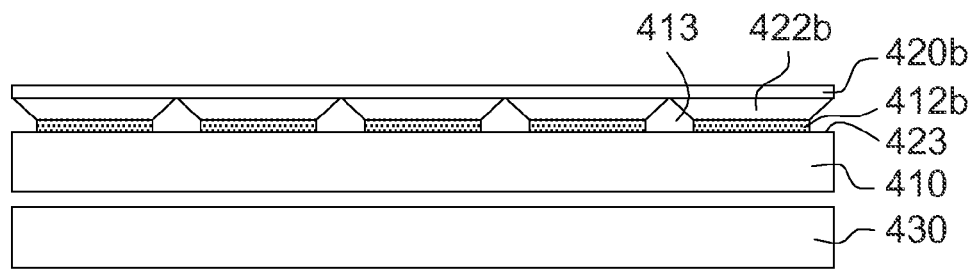

Referring to FIG. 11B, a schematic diagram of an optical film 420b disposed on a display panel 410 by using a glue 412b is shown. In the present embodiment, the micro structures 422b is such as the trapezoidal structures of FIG. 9, the glue 412b is formed on the trapezoidal micro structures 422b facing and close to a plane 423 of the display panel 410 for bonding the micro structures 422b and the display panel 410 together. The gap 413 between the trapezoidal micro structures 422b and trapezoidal micro structures 422b may be filled with air instead of glue. In the present embodiment, the light is transmitted between the micro structures 422b and the air in the gap 413 without going through glue, and can thus be deflected to even larger angles.

In the present embodiment, the disposition of the micro structures is exemplified by facing the display panel. However, the disposition in which the micro structures opposite to the display panel may also increase the viewing angle and improve the problem of narrow viewing angle. When the micro structures disposed opposite to the display panel, the disposition of the micro structures may adopt the design of various periods and shapes as indicated in the above embodiments.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A liquid crystal display, comprising:
a display panel;
an optical film disposed on the display panel, wherein the optical film has a plurality of micro structures facing the display panel arranged on the optical film, and an arrangement period of the micro structures is between 90 μm~3 μm; and a backlight module, wherein the backlight module and the optical film are disposed on opposite sides of the display panel respectively, and the backlight module is used for emitting a light;

wherein, the light penetrates the display panel and reaches the optical film, and the light deflected by the micro structures of the optical film is emitted to the outside at an angle of 20~70 degrees relative to a normal line of a light outputting plane of the optical film.

2. The liquid crystal display according to claim 1, wherein the micro structures are triangular prisms arranged in strips.

3. The liquid crystal display according to claim 2, wherein the micro structures are in the shape of isosceles triangles, non-isosceles triangles or equilateral triangles.

4. The liquid crystal display according to claim 2, wherein the apex angles of the micro structures are between 135~40 degrees.

5. The liquid crystal display according to claim 2, wherein the arrangement direction of the micro structures is perpendicular to an axis of the deflection orientation of the light.

6. The liquid crystal display according to claim 2, wherein the apex of the micro structures are in the shape of an arc.

7. The liquid crystal display according to claim 2, wherein a base angle of a part of the micro structures is smaller than that of other micro structures adjacent thereto.

8. The liquid crystal display according to claim 1, wherein a distribution area of the micro structures occupies more than 20% of the area of the optical film.

9. The liquid crystal display according to claim 1, wherein an area of each period in which the micro structures are disposed occupies more than 0.2 times of the area of each period.

10. The liquid crystal display according to claim 1, wherein refractive index of the micro structures is between 1.4~1.8.

11. The liquid crystal display according to claim 1, further comprising a glue formed between the micro structures and the display panel.

12. The liquid crystal display according to claim 1, wherein the micro structures are prisms arranged in strips.

13. The liquid crystal display according to claim 12, wherein the micro structures are in the shape of trapezoids.

14. The liquid crystal display according to claim 13, further comprising a glue disposed on the trapezoidal micro structures close to a plane of the display panel.

15. The liquid crystal display according to claim 14, when a height of a triangle whose base plane and base angle are identical to that of the trapezoidal micro structures is h, a height of the trapezoidal micro structures is between 0.08~0.5 h.

16. A liquid crystal display, comprising:
a display panel;
an optical film disposed on the display panel, wherein the optical film has a plurality of micro structures, and an arrangement period of the micro structures is between 90 μm~3 μm; and
a backlight module, wherein the backlight module and the optical film are disposed on opposite sides of the display panel respectively, and the backlight module is used for emitting a light.

17. The liquid crystal display according to claim 16, wherein the micro structures face the display panel.

18. The liquid crystal display according to claim 16, wherein the micro structures are disposed opposite to the display panel.

* * * * *